United States Patent
Zhou et al.

(10) Patent No.: US 9,869,791 B2
(45) Date of Patent: Jan. 16, 2018

(54) MEASUREMENT OF DOWNHOLE RADIATION

(71) Applicant: Baker Hughes Incorporated, Houston, TX (US)

(72) Inventors: Quming Zhou, Houston, TX (US); Qiong Zhang, Houston, TX (US); Hao Zhang, The Woodlands, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 155 days.

(21) Appl. No.: 14/742,641

(22) Filed: Jun. 17, 2015

(65) Prior Publication Data

US 2016/0370494 A1    Dec. 22, 2016

(51) Int. Cl.
*G01V 5/04* (2006.01)
*G01T 1/20* (2006.01)
*G01T 1/17* (2006.01)

(52) U.S. Cl.
CPC ............... *G01V 5/04* (2013.01); *G01T 1/17* (2013.01); *G01T 1/20* (2013.01)

(58) Field of Classification Search
CPC .................................... G01T 1/20; G01V 5/04
USPC ......................................................... 250/256
See application file for complete search history.

(56) References Cited

U.S. PATENT DOCUMENTS

| | | | |
|---|---|---|---|
| 3,890,501 A | 6/1975 | Johnstone | |
| 4,055,763 A | 10/1977 | Antkiw | |
| 4,152,596 A | 5/1979 | Marshall, III | |
| 5,067,090 A | 11/1991 | Seeman | |
| 5,132,540 A | 7/1992 | Adolph et al. | |
| 5,349,195 A | 9/1994 | Dumont | |
| 6,936,822 B2 | 8/2005 | Wong et al. | |

(Continued)

FOREIGN PATENT DOCUMENTS

| WO | 2012158759 A2 | 11/2012 |
|---|---|---|
| WO | 2014126571 A1 | 8/2014 |
| WO | 2014165354 A1 | 10/2014 |

OTHER PUBLICATIONS

Int'l Search Report & Written Opinion in PCT/US2016/037749 dated Sep. 28, 2016.

(Continued)

*Primary Examiner* — David Porta
*Assistant Examiner* — Meenakshi Sahu
(74) *Attorney, Agent, or Firm* — Mossman, Kumar & Tyler, PC

(57) ABSTRACT

Systems, methods and devices for evaluating an earth formation intersected by a borehole. Method embodiments may include using a downhole tool in the borehole to generate a plurality of signal pulses responsive to detected radiation; using at least one signal quality characteristic of each pulse of the plurality of pulses to classify each pulse as belonging to at least one subset of a plurality of pulse subsets; and using one of more of the plurality of pulse subsets to estimate a value of a parameter of interest. The signal quality characteristic may be indicative of a pulse pile-up condition being associated with the respective pulse. The signal quality characteristic may include at least one of: i) rising time (slope) of the respective pulse; ii) time between a peak of the respective pulse and a peak of a closest following pulse; iii) pulse width; and iv) skewness of the pulse.

17 Claims, 9 Drawing Sheets

(56) References Cited

U.S. PATENT DOCUMENTS

| | | | |
|---|---|---|---|
| 7,065,473 B2 | 6/2006 | Warburton et al. | |
| 7,309,857 B2 | 12/2007 | Gardner | |
| 7,573,026 B2 | 8/2009 | Kurkoski et al. | |
| 7,626,178 B2 | 12/2009 | Ivan et al. | |
| 7,966,155 B2 | 6/2011 | Warburton et al. | |
| 8,027,811 B2 | 9/2011 | Camus et al. | |
| 8,969,813 B2 | 3/2015 | Nikitin et al. | |
| 2006/0157655 A1 | 7/2006 | Mammone et al. | |
| 2011/0112810 A1 | 5/2011 | Scoullar et al. | |
| 2011/0161009 A1 | 6/2011 | Wang | |
| 2011/0282818 A1* | 11/2011 | Chen | G01V 5/125 706/21 |
| 2012/0326043 A1 | 12/2012 | Duraj | |
| 2013/0048849 A1 | 2/2013 | Li et al. | |
| 2013/0146775 A1 | 6/2013 | Ramsden et al. | |
| 2014/0151567 A1 | 6/2014 | Slaughter et al. | |
| 2014/0197307 A1* | 7/2014 | Jorion | G01T 1/17 250/252.1 |

OTHER PUBLICATIONS

Savran, D., et al., "Pulse Shape Classificatin in Liquid Scintillators Using the Fuzzy C-Means Algorithm," Nuclear Instruments and Methods in Physics Research A 624, pp. 675-683 (2010).

\* cited by examiner

MEASUREMENT OF DOWNHOLE RADIATION

FIELD OF THE DISCLOSURE

In one aspect, this disclosure generally relates to borehole logging methods and apparatuses for estimating at least one parameter of interest relating to a volume of matter using nuclear radiation based measurements.

BACKGROUND OF THE DISCLOSURE

Using nuclear techniques to investigate volumes of either organic or inorganic matter is well known. For example, naturally radioactive elements are commonly found in earth formations in various proportions, depending on the type of lithology and other factors. Radioactive isotopes of potassium, uranium, and thorium are typical regularly occurring naturally radioactive elements commonly quantified in the petroleum industry.

A rigid or non-rigid conveyance device is often used to convey one or more nuclear radiation detectors into a borehole intersecting the earth formation, often as part of a tool or a set of tools. There, the detector(s) may be used to estimate radiation associated with a volume of interest of the earth formation by generating a response to the one or more types of nuclear radiation present in the near-borehole environment during measurement. This response may then be used to estimate a parameter of interest of the volume. In nuclear logging, additional radioactive isotopes may be generated by providing radiation (e.g., neutron bombardment) to the formation.

Oil well logging has been known for many years and provides an oil and gas well driller with information about the particular earth formation being drilled. One or more parameters of interest of the earth formation obtained as above may relate to hydrocarbon exploration or production. For example, the parameter of interest may provide indications of the location and extent of hydrocarbons in a given earth formation. A rigid or non-rigid carrier may also provide communication channels for sending information up to the surface.

SUMMARY OF THE DISCLOSURE

In aspects, the present disclosure is related to methods of estimating a parameter of interest of a formation using radiation detected from a subterranean formation.

One embodiment according to the present disclosure may be a method of evaluating an earth formation intersected by a borehole. Method embodiments may include using a downhole tool in a borehole intersecting the formation to generate a plurality of signal pulses responsive to detected radiation; using at least one signal quality characteristic of each pulse of the plurality of pulses to classify each pulse as belonging to at least one subset of a plurality of pulse subsets; and using one of more of the plurality of pulse subsets to estimate a value of a parameter of interest. The signal quality characteristic may be indicative of a pulse pile-up condition being associated with the respective pulse. The signal quality characteristic may include at least one of: i) rising time (slope) of the respective pulse; ii) time between a peak of the respective pulse and a peak of a closest following pulse; iii) pulse width; and iv) skewness of the pulse.

The detected radiation may include neutrons, gamma rays, and the subset of pulses represents a gamma ray spectrum. Processing the gamma ray spectrum may be carried out using at least one of: i) a windowing method; and ii) a full-spectrum deconvolution method. The gamma ray spectrum may include at least one of: i) an inelastic gamma ray spectrum, and ii) a capture gamma ray spectrum. The method may include presenting a depiction of a first group of pulses comprising a first subset of the plurality of pulse subsets in contrast with a depiction of a second group of pulses comprising a second subset of the plurality of pulse subsets and/or selecting the one or more pulse subsets for use in of the plurality of subsets for estimating the property in dependence upon a selected parameter of interest. The method may include selecting the one or more pulse subsets for use in of the plurality of subsets for estimating the property in dependence upon a selection of relative importance of accuracy with respect to count rate.

The pulses may be digital pulses resulting from continuous analog-to-digital conversion. The downhole tool comprises a scintillation detector on a conveyance device. Using the downhole tool to generate the plurality of signal pulses may include using the scintillation detector to generate electrical events responsive to scintillation events, and converting the electrical events to the signal pulses.

Another embodiment according to the present disclosure may be an apparatus for evaluating an earth formation intersected by a borehole. The apparatus may include at least one detector configured to generate a plurality of signal pulses responsive to detected radiation; and at least one processor configured to carry out methods of the present disclosure. The process may be configured to: use the at least one detector to generate a plurality of signal pulses responsive to radiation detected while the detector is in the borehole; use at least one signal quality characteristic of each pulse of the plurality of pulses to classify each pulse as belonging to at least one subset of a plurality of pulse subsets; and use one of more of the plurality of pulse subsets to estimate a value of a parameter of interest.

Another embodiment according to the present disclosure may be an apparatus for estimating a parameter of an earth formation, comprising: a processor; a subsystem non-transitory computer-readable medium; and a program stored by the non-transitory computer-readable medium comprising instructions that, when executed, cause the processor to perform methods described herein.

Another embodiment according to the present disclosure may be a non-transitory computer-readable medium product for evaluating an earth formation comprising machine-readable instructions disposed on the medium that, when executed by a processor, cause the at least one processor to carry out a method including using a downhole tool in a borehole intersecting the formation to generate a plurality of signal pulses responsive to detected radiation; using at least one signal quality characteristic of each pulse of the plurality of pulses to classify each pulse as belonging to at least one subset of a plurality of pulse subsets; and using one of more of the plurality of pulse subsets to estimate a value of a parameter of interest.

Embodiments according to the present disclosure may include a pulsed neutron source. Digital pulse processing as described herein may include analog-to-digital conversion, digital pulse shaping, pulse detection, pulse classification, and multi-level spectra made up of various subset of detected pulses. The pulse shaping may be implemented as a digital filter, which is reprogrammable and adaptive to the pulse rate of the system. A pulse detection apparatus in accordance with the disclosure may be configured to detect all pulses without gating or pulse loss. Detected pulses may be classified into several categories with different confidences in detection accuracy. Pulses with the same confidence may be built into energy and time spectra. Depending on the application, spectra at different confidences can be further merged.

The subsets associated with particular pulses may be further adjusted based on various parameters, e.g. logging speed, count rate, and the like. In deconvolution, a high confidence spectrum may be used first to obtain accurate peak locations for better gain adjustment and calibration. After this initial step, pulses with lower confidences near the peak locations with a predefined bottom boundary value which is the lowest possible energy level calculated due to the pulse pile-up may be added into the high confidence spectrum using statistical algorithms such as Gaussian distribution or gamma functions. This can increase the count rates of the spectra. Various spectra with different confidence levels can be used for quality control (QC) purpose by comparing the shape of the derived spectra.

Examples of features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

Figure 1:
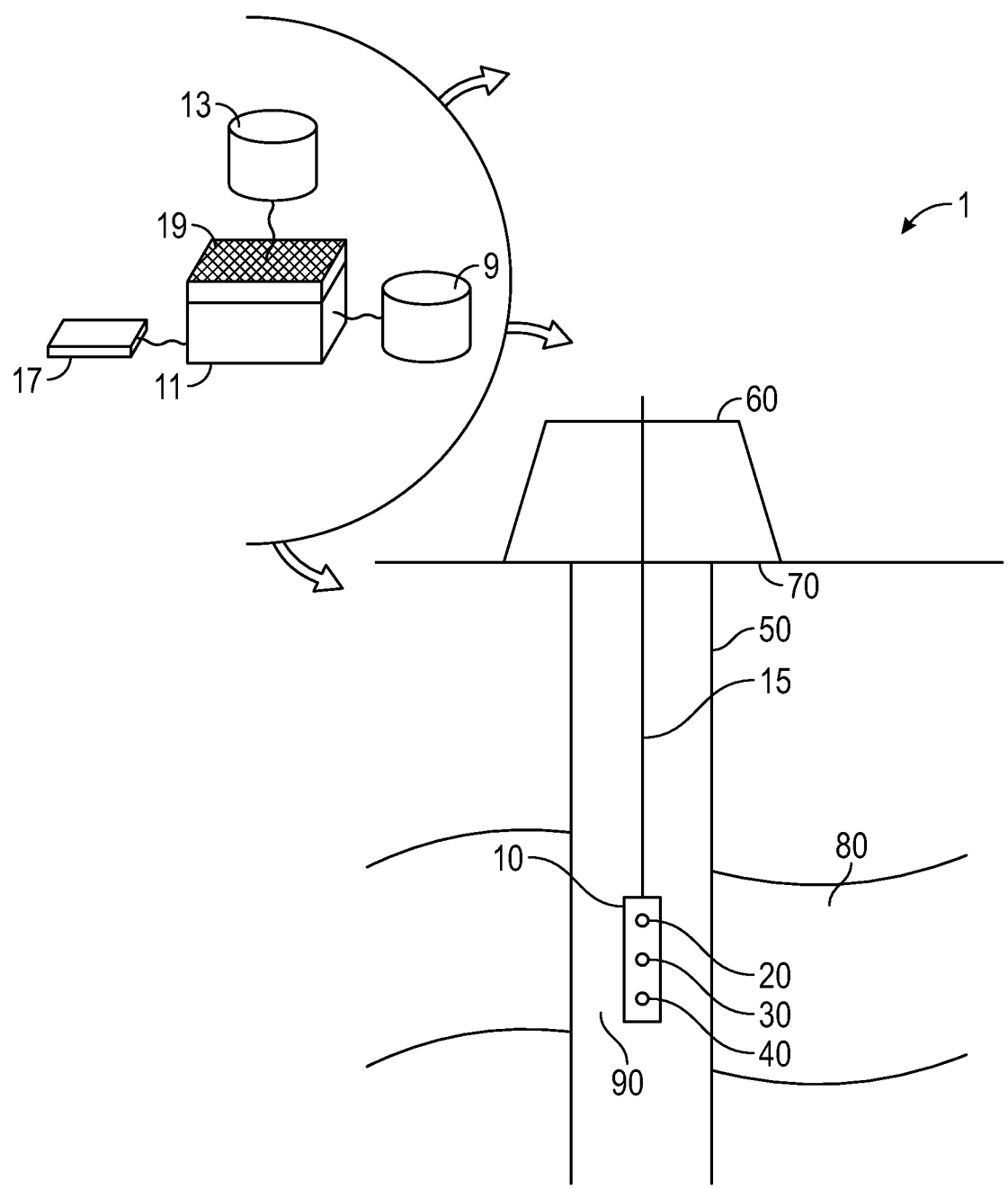
FIG. 1 schematically illustrates a system having a downhole tool in accordance with embodiments of the present disclosure.

In aspects, this disclosure relates to using a downhole tool to detect radiation from a subterranean formation. In other aspects, this disclosure relates to estimating a parameter of interest of a subterranean formation from detected radiation.

Illustrative methods for estimating a parameter of interest may include the acquisition and utilization of information characterizing pulses detected at a single detector or a group of detectors. In many instances, the information used for these estimations may be acquired by tools conveyed in a wellbore intersecting one or more formations of interest. For context, an exemplary system for deploying and using such tools to acquire this information is described below. Each of these aspects may be referred to generally as investigation of the formation.

In some embodiments, the detectors may detect radiation from naturally occurring radionuclides. In other embodiments, the formation may be exposed to energy from a radiation source. Downhole tools may include this radiation source and one or more detectors. Herein, the radiation source may include, but is not limited to, one or more of a neutron source, a gamma-ray source, or an X-ray source. The detectors may be used to detect radiation from the formation, though the detectors are not limited to detecting radiation of the same type as emitted by the radiation source. Detectors may include at least one radiation responsive component, such as a scintillation media (e.g., a scintillation crystal, such as bismuth germanium oxide ('BGO')) or a semiconductor material (e.g., gallium nitride); and at least one output device generating information in response to detections in the radiation responsive component. The output device may be implemented with a photomultiplier tube ('PMT').

The light yield of a crystal is proportional to deposited radiation energy. The PMT converts the light output of the crystal into an electrical charge (e.g., current) pulse following each scintillation event. In some implementations, a preamplifier circuit may be placed after the PMT to integrate the burst electric charge into a voltage signal, although other types of signals may be used. The magnitude of the voltage signal corresponds to the energy of gamma rays, and information from the output device may include an energy spectrum representative of the detected radiation. The energy spectrum may be expressed in terms of magnitude (e.g., gamma ray counts per period of time) as a function of energy.

The energy spectrum may be used to estimate parameters of interest of an earth formation. For example, the radioactive decay of radionuclides may produce nuclear radiation that may be detected by radiation detectors, as described above. Radionuclides may include naturally occurring radionuclides, such as potassium-40, and the uranium and thorium series, which exist in the earth formation and activated radionuclides, which may include radionuclides activated from the irradiation of nuclides with nuclear radiation. Since the energy spectrum may include energy spectrum components from multiple radionuclides, the nuclear radiation information may be separated to identify the energy spectrum components contained within the energy spectrum, and thereby estimate the concentration of at least one radionuclide in the volume of interest of the earth formation.

Pulses from the PMT tend to be randomly spaced in time, and may not be evenly distributed. In a high counting system, this randomness can lead to interfacing effects between pulses. These effects are generally known as "pile-up," which leads to distortions in the recorded spectrum and the first-detected pulse. Pile-up phenomena can be classified into two general types, which have somewhat different effects on pulse height measurements. The first type is known as tail pile-up and involves the superposition of pulses on the long-duration tail from a preceding pulse. One remedy for tail pile-up is to eliminate the residual tails. A second type of pile-up, generally called peak pile-up, occurs when two or more pulses are sufficiently close together so that they are treated as a single pulse by the analysis system.

Pile-up can be minimized by making the total width of the pulses as small as possible. However, other considerations (e.g., baseline shift, single-to-noise requirements, etc.) prohibit reduction of the pulse width beyond certain thresholds. Effects of pulse pile-up in high rate systems, therefore, can be significant.

Another technique for addressing pile-up is to mitigate pulse height spectrum effects arising from a peak pile-up by using pile-up rejection. In pile-up rejection, the first detected pulse will be kept while the rest pulses within a latch window will be discarded. However, the latch window causes dead time losses, which can be problematic.

Pulse Classification

Aspects of the present disclosure may use at least one signal quality characteristic of each pulse of the detected pulses to classify each pulse as belonging to at least one subset of a plurality of pulse subsets. In this way a confidence level (e.g., risk level, certainty indicator, or quality indicator) may be assigned to each detected pulse corresponding to a level of accuracy or quality of the pulse. The pulses may be combined and a spectrum may be built corresponding to each confidence level. The spectra at different confidence levels may then be combined according to the requirements of particular applications.

Instead of addressing the inaccuracy caused by pulse pile-up in digital pulse processing, aspects of the present disclosure may utilize the detected pulses according to a hierarchy of detection accuracy. As a result, a spectrum satisfying the requirements of a particular application or context can be derived. Particular spectra may, for example, represent a higher confidence level or faster logging speed. This hierarchy may therefore be employed in building spectra for further analysis of the information according to conventional methods, as described below.

As mentioned above, a gamma ray spectrum may be used for estimating the concentration of at least one radionuclide in the volume of interest of the earth formation. Gamma ray counts and other radiation counts may also be used for estimating further parameters of interest of the volume of interest of the earth formation. A description for some embodiments estimating these parameters of interest follows below. The estimation may be performed in multiple stages, such that an earlier stage may process the information for a later stage. One of the stages may include a technique of elemental standards-based spectral decomposition (also known as a yields method), described in further detail below.

General embodiments in accordance with the invention may include systems, methods and devices for evaluating an earth formation intersected by a borehole. Methods may include using a downhole tool in a borehole intersecting the formation to generate a plurality of signal pulses responsive to detected radiation; using at least one signal quality characteristic of each pulse of the plurality of pulses to classify each pulse as belonging to at least one subset of a plurality of pulse subsets; and using one of more of the plurality of pulse subsets to estimate a value of a parameter of interest. The detected radiation may be indicative of a parameter of interest of the formation or the borehole. The signal quality characteristic may be indicative of a pulse pile-up condition being associated with the respective pulse. For example, the signal quality characteristics used may include at least one of: i) rising time (slope) of the respective pulse; ii) time between a peak of the respective pulse and a peak of a closest following pulse; iii) pulse width; and and iv) skewness of the pulse (the third moment of the standard score of the pulse). In some implementations the detected radiation includes gamma rays and the subset of pulses represents a gamma ray spectrum. The gamma ray spectrum (or other applicable response spectrum) refers to not only the spectrum as originally acquired, but also after filtering, corrections, or pre-processing is applied.

Also disclosed are borehole investigation methods, systems, and apparatus for estimating formation properties using nuclear radiation, particularly an apparatus and method for estimating parameters of a formation. The method may include using gamma ray count rate information or neutron count information from a detector to estimate various parameters of interest. General apparatus and system embodiments may include a processor and storage subsystem with a program that, when executed, implements the method.

FIG. 1 schematically illustrates a system 100 having a downhole tool 10 configured to acquire information in a borehole 50 intersecting a volume of interest of an earth formation 80 for estimating density, oil saturation, and/or other parameters of interest of the formation 80. The parameters of interest may include information relating to a geological parameter, a geophysical parameter, a petrophysical parameter, and/or a lithological parameter. Thus, the tool 10 may include a sensor array 30 including sensors for detecting physical phenomena indicative of the parameter of interest x may include sensors for estimating formation resistivity, dielectric constant, the presence or absence of hydrocarbons, acoustic density, bed boundary, formation density, nuclear density and certain rock characteristics, permeability, capillary pressure, and relative permeability.

The sensor array 30 may include sensors 20, 25 for detecting radiation (e.g., radiation detectors). Detectors 20, 25 may detect radiation from the borehole, the tool, or the formation. In one illustrative embodiment, the tool 10 may also contain a radiation source 40.

The system 100 may include a conventional derrick 60 and a conveyance device (or carrier) 15, which may be rigid or non-rigid, and may be configured to convey the downhole tool 10 into wellbore 50 in proximity to formation 80. The carrier 15 may be a drill string, coiled tubing, a slickline, an e-line, a wireline, etc. Downhole tool 10 may be coupled or combined with additional tools. Thus, depending on the configuration, the tool 10 may be used during drilling and/or after the borehole (wellbore) 50 has been formed. While a land system is shown, the teachings of the present disclosure may also be utilized in offshore or subsea applications. The carrier 15 may include embedded conductors for power and/or data for providing signal and/or power communication between the surface and downhole equipment. The carrier 15 may include a bottom hole assembly, which may include a drilling motor for rotating a drill bit.

In embodiments, the radiation source 40 emits radiation (e.g., gamma rays or neutrons) into the formation to be surveyed. In one embodiment, the downhole tool 10 may use a pulsed neutron generator emitting 14.2 MeV fast neutrons as its radiation source 40. The use of 14.2 MeV neutrons from a pulsed neutron source is illustrative and exemplary only, as different energy levels of neutrons may be used. In some embodiments, the radiation source 40 may be continuous. In some embodiments, the radiation source 40 may be controllable in that the radiation source may be turned "on" and "off" while in the wellbore, as opposed to a radiation source that is "on" continuously. The measurements performed using this type of radiation may be referred to as "sourceless" measurements since they employ a source that may be turned off, as opposed to a continuously emitting chemical radiation source.

The detectors 20, 30 provide signals that may be used to estimate the radiation counts (e.g., gamma ray counts or neutron counts) returning from the formation. Generally, detectors 20, 30 are spaced in a substantially linear fashion relative to the radiation source. If two detectors are used, there may be a short spaced (SS) detector and a long spaced (LS) detector, wherein the detectors have different distances from the radiation source. For instance, in one embodiment, detector 30 may be a short spaced detector, and detector 20 may be a long spaced detector. The SS and LS detectors are not limited to being placed on the same side of the radiation source and their spacing from the radiation source may be equal or unequal. Additional detectors may be used to provide additional radiation information. Two or more of the detectors may be gamma ray detectors. Some embodiments may include radiation shielding (not shown), which may be located between radiation source 40 and the detectors 20, 30. Radiation shielding may include, but is not limited to, gamma-ray shielding and neutron shielding. Drilling fluid 90 may be present between the formation 80 and the downhole tool 10, such that emissions from radiation source 40 may pass through drilling fluid 90 to reach formation 80 and radiation induced in the formation 80 may pass through drilling fluid 90 to reach the detectors 20, 30. In other embodiments, naturally occurring radiation may pass through drilling fluid 90 to reach the detectors 20, 30.

Certain embodiments of the present disclosure may be implemented with a hardware environment that includes an information processor 11, an information storage medium 13, an input device 17, processor memory 19, and may include peripheral information storage medium 9. The hardware environment may be in the well, at the rig, or at a remote location. Moreover, the several components of the hardware environment may be distributed among those locations. The input device 17 may be any data reader or user input device, such as data card reader, keyboard, USB port, etc. The information storage medium 13 stores information provided by the detectors. Information storage medium 13 may include any non-transitory computer-readable medium for standard computer information storage, such as a USB drive, memory stick, hard disk, removable RAM, EPROMs, EAROMs, flash memories and optical disks or other commonly used memory storage system known to one of ordinary skill in the art including Internet based storage. Information storage medium 13 stores a program that when executed causes information processor 11 to execute the disclosed method. Information storage medium 13 may also store the formation information provided by the user, or the formation information may be stored in a peripheral information storage medium 9, which may be any standard computer information storage device, such as a USB drive, memory stick, hard disk, removable RAM, or other commonly used memory storage system known to one of ordinary skill in the art including Internet based storage. Information processor 11 may be any form of computer or mathematical processing hardware, including Internet based hardware. When the program is loaded from information storage medium 13 into processor memory 19 (e.g. computer RAM), the program, when executed, causes information processor 11 to retrieve detector information from either information storage medium 13 or peripheral information storage medium 9 and process the information to estimate a parameter of interest. Information processor 11 may be located on the surface or downhole.

The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information. In several non-limiting aspects of the disclosure, an information processing device includes a computer that executes programmed instructions for performing various methods. These instructions may provide for equipment operation, control, data collection and analysis and other functions in addition to the functions described in this disclosure. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on.

In one embodiment, electronics associated with the detectors (described in further detail below with respect to FIG. 2) may be configured to record radiation counts from at least two axially spaced detectors 20, 30 and generate a time-dependent ratio between axially spaced detectors by using information from multiple bursts. This detection may be substantially continuous, which may be defined as occurring within very narrow time bins or windows (less than 1000 microseconds, or less than 10 microseconds). This ratio may be expressed as a curve or other graphical function that describes a combination of multiple ratio values. In some embodiments, the parameter of interest may be estimated using a difference between the detector counts. Herein, the term time-dependent broadly describes the property of the ratio to vary with time, as opposed to a ratio that remains constant, such as may occur with a continuous radiation source. Various properties of the formation may be determined using the time-dependent ratio curve, including, but not limited to, porosities of the formation.

In other embodiments, such electronics may be located elsewhere (e.g., at the surface, or remotely). To perform the treatments during a single trip, the tool may use a high bandwidth transmission to transmit the information acquired by detectors 20, 30 to the surface for analysis. For instance, a communication line for transmitting the acquired information may be an optical fiber, a metal conductor, or any other suitable signal conducting medium. It should be appreciated that the use of a "high bandwidth" communication line may allow surface personnel to monitor and control the treatment activity in "real time."

Figure 2:
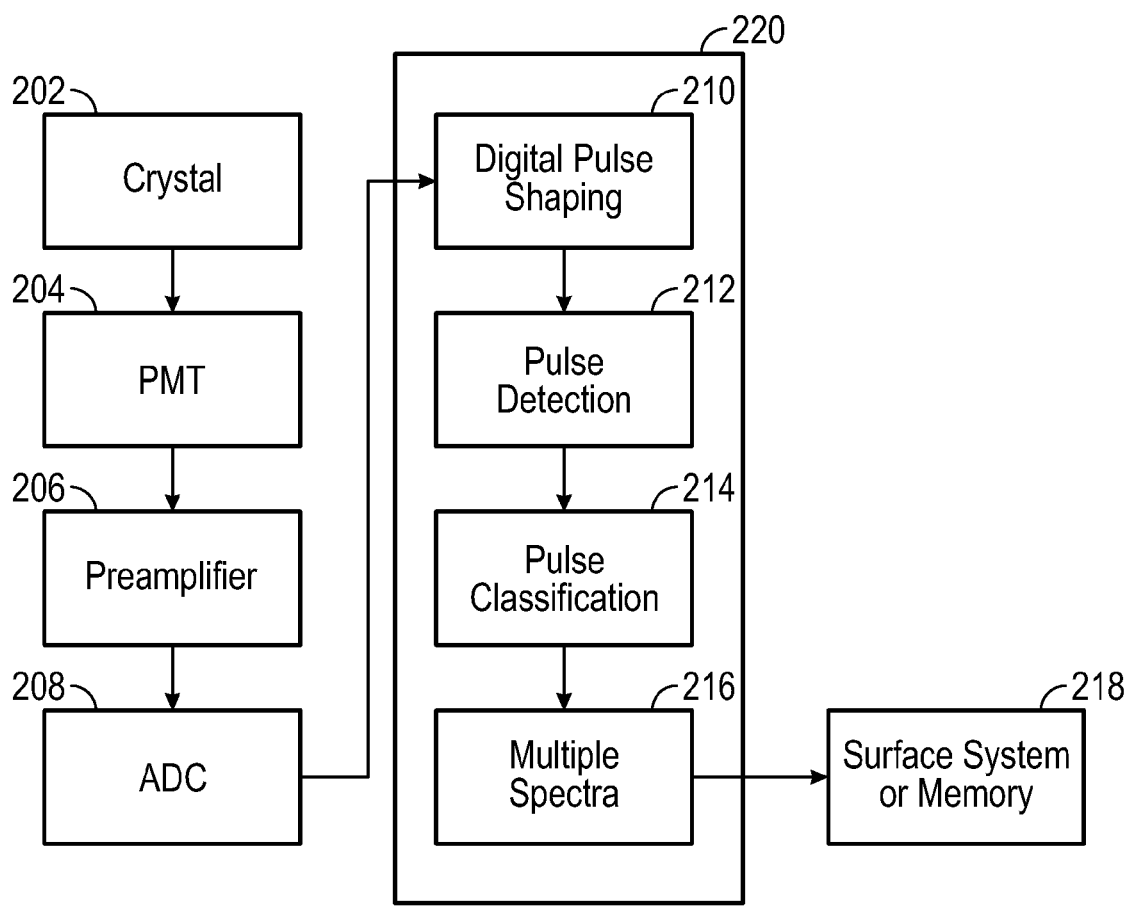
FIG. 2 is a data flow diagram illustrating an example system architecture in accordance with embodiments of the present disclosure.

FIG. 2 is a data flow diagram illustrating an example system architecture in accordance with embodiments of the present disclosure. The system includes a scintillation crystal 202 producing light scintillations responsive to incident radiation. The light interacts with a PMT 204 which produces an analog electrical (e.g., voltage) signal. To deliver a high counting system, crystals with fast decay time constants, such as, for example, Prelude420 ™ (LYSO) and BriLance380 ™ (LaBr3) (having a primary decay time of 41 ns and 16 ns, respectively) may be utilized. This signal runs through a preamplifier 206 and analog-to-digital converter ('ADC') 208 in turn. The decay time constant of the preamplifier 206 may be selected between 100 ns and 300 ns, which is about six times larger than that of the crystal. The signal emerging from the ADC 208 is a digital signal, which may be operated on, in turn, by various logic modules.

In FIG. 2, the logic modules include a pulse shaping module 210, a pulse detection module 212, and a pulse classification module 214, and spectra building module 216. The logic modules may be implemented in a variety of ways, but here they are implemented as a single a field-programmable gate array ('FPGA') 220. The FPGA then sends the spectra to local or remote memory or to a remote subsystem 218.

In operation, the pulse shape features a fast rising edge and a slow falling edge. The rising edge is primarily determined by the crystal and the falling edge is dominated by the preamplifier circuit. According to Eqn. 2, $t_{peak}$ is dominated by the crystal, which minimizes the possibility of the peak pile-up. The moderate time constant of the preamplifier can achieve a balance between the tail pile-up and the accuracy in peak detection. The ADC runs continuously to sample the pulse signal outputted by the preamplifier. The digitalized data stream is then processed by a field-programmable gate array (FPGA).

Figure 3A:
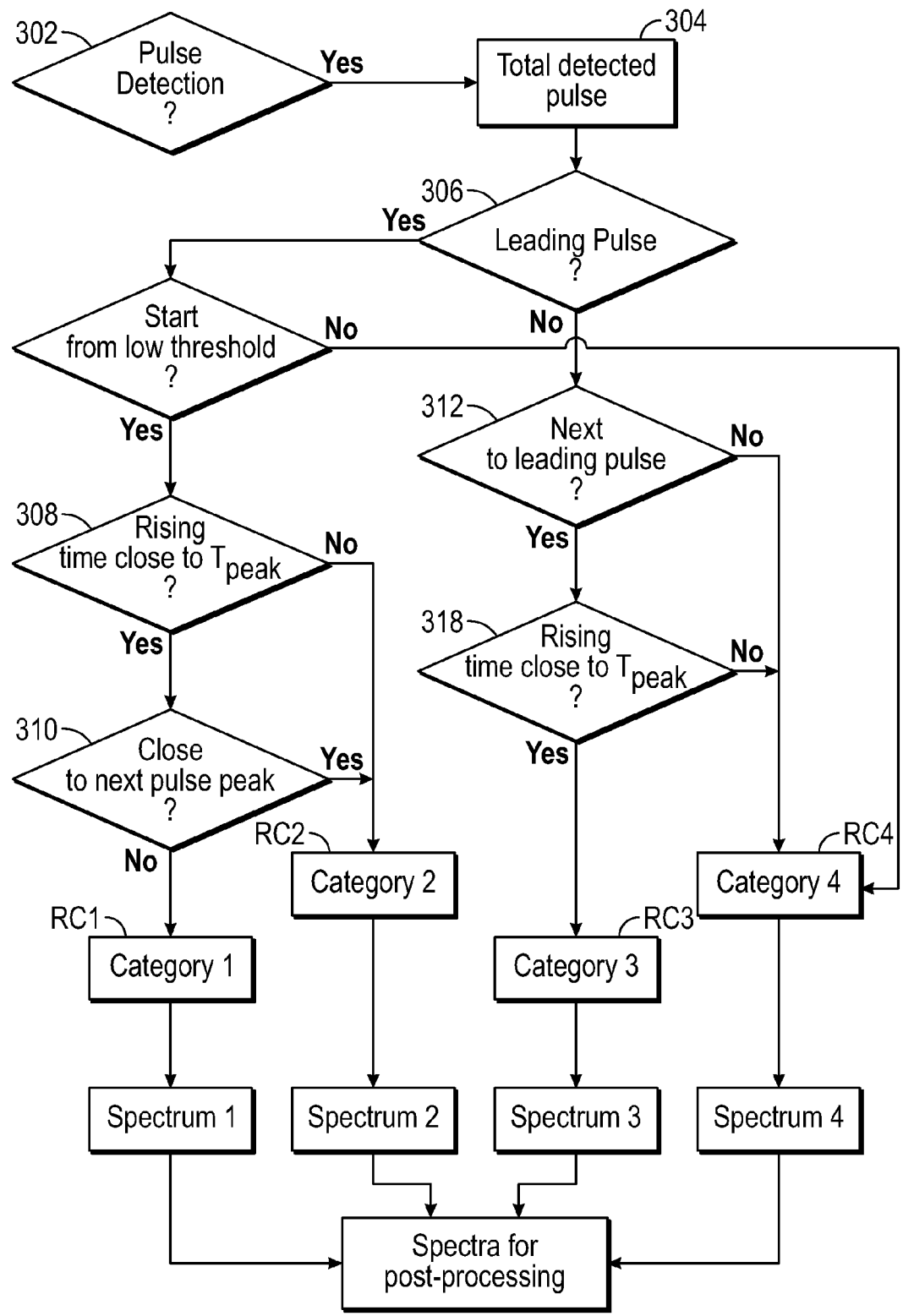
FIG. 3A is a flow chart illustrating methods in accordance with embodiments of the present disclosure.

FIG. 3A is a flow chart illustrating methods in accordance with embodiments of the present disclosure. The method may be implemented in a hardware environment as described herein. The pulse shape after the preamplifier can be well approximated by a double exponential function. As we show in [Appendix A], the pulse peak occurs at the same moment independent of its amplitude. The peak time $t_{peak}$ is a function of time constants of the detector and the preamplifier (Eqn. 2).

At module 302, a pulse is detected. The total number of pulses 304 are detected and reported. The leading pulses are identified at step 306. The leading pulses are the first detected pulses starting from the background threshold in a series of pile-up pulses.

For leading pulses, it is determined if the pulse starts from a low threshold (step 307), if the pulses have a rising time close to the theoretic value $t_{peak}$ ((step 308) and the if peak of the next pulse is not close to the next close peak (step 310) (that is, at least $t_{peak}$ away from the current peak). If each of these conditions is met, the pulse is characterized as belonging to risk category (or confidence category) 1 ('RC1'). The amplitude of this type of pulse can be most accurately detected. Spectrum 1 is constructed using pulses belonging to the subset RC1.

If the pulse starts from a low threshold but either of other conditions are not met, the pulse is characterized as belonging to risk category 2 ('RC2'). That is, a pulse is defined as RC2 if the leading pulse has a rising time not close to the theoretic value $t_{peak}$ or the peak of the next pulse is less than $t_{peak}$ to the current peak, assuming that it has started from a low threshold. The detection of this pulse type is less accurate than RC1. Spectrum 2 is constructed using pulses belonging to the subset RC2.

If a leading pulse does not start from a low threshold, it is assigned to the subset risk category 4 ('RC4'). This type of pulse is the least accurate pulse detected.

If a pulse is determined to not be a leading pulse at step 306, it is if the pulse is next to a leading pulse (step 312) and the if the pulse (starting from the decaying slope of a leading pulse) has a rising time close to the theoretic value $t_{peak}$ (step 318). If each of these conditions is met, the pulse is characterized as belonging to risk category 3 ('RC3'). The detection of this pulse type can be accurate after decoupling the pulse overlap. Spectrum 3 is constructed using pulses belonging to the subset RC3. The remaining pulses are assigned to RC4. Spectrum 4 is constructed using the pulses in RC4. This spectrum will yield the lowest confidence.

All four spectra may be output for post-processing selection. Section may be dependent on the user's requirements in the confidence level. The spectra may correspond to confident level (with confidence options 1-4 with 1 representing the highest confidence and 4 the lowest confidence) or the pulse count rate, which is the total counts in the spectrum. If the highest confidence is the utmost priority, Spectrum 1 may be selected for post processing; if the highest detected counts is the priority, all of Spectra 1-4 may be selected for post processing. Higher logging speed can be achieved by trading off confidence level to increase the count rate. So the proposed system can provide various spectrum options depending on confidence level or logging speed compared to the existing systems.

Taking pulses with low confidence into the spectra can increase the count rate, which in turn reduces the logging time. Only taking pulse with the highest confidence to build spectra can reduce the noise level but resulting in a low count rate. The best confidence level used to merge the spectra can be justified by off-line experiences and simulation.

In some implementations, the pulses belonging to one or more of the subsets (or the corresponding spectrum) may be further processed in dependence upon characterization. Depending on the application, pulses in RC3 may be upgraded to RC1 by using other statistical analysis or signal manipulation to increase accuracy of the subset (e.g., via decoupling). Decoupling may be carried out by adjusting the pulse peak by subtracting the overlap that is caused by previous pulses. The overlap can be predicted by a linear model, a quadratic model, or an exponential mode. The pulse peak without the overlap adjustment is the upper boundary of the true peak, and the adjusted peak (obtained by simply subtracting the previous valley) is the lower boundary. This may result in a larger overall approximation error than predicted, but may be useful in particular applications, such as, for example, in the carbon and oxygen logging application due to the yielded boundary. If the upper boundary is within the carbon energy window, the detected peak can be safely classified into RC1. Similarly, if the low boundary is within the oxygen energy window, the detected peak can also be safely classified into Category 1.

As described above, aspects of the present disclosure may be applied to any type of radiation detection system, or for any other pulse-based detection system downhole where pile-up is an issue. One particularly useful implementation of the present disclosure relates to pulsed neutron logging. In pulsed neutron tools, neutrons (e.g., approximately 14.1 MeV fast neutrons) are generated from the pulsed neutron generator and scattered into the formation. Neutrons may interact with the formation in at least two ways: inelastic interactions and capture interactions.

Figure 3B:
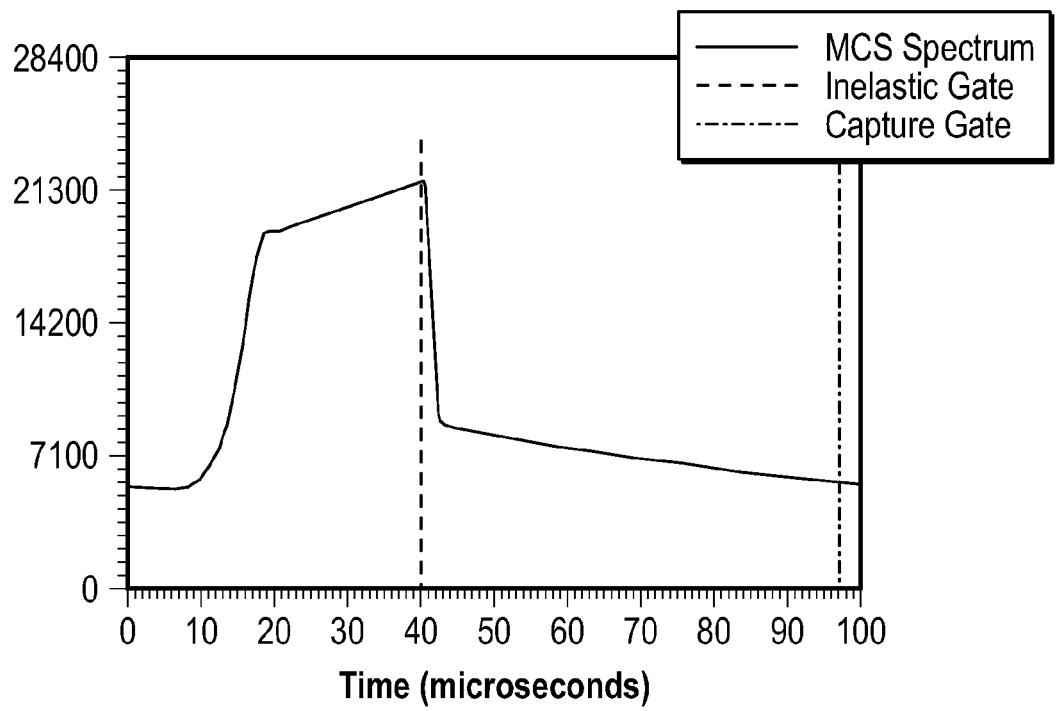
FIG. 3B is an illustration of a neutron burst cycle in accordance with embodiments of the present disclosure.

FIG. 3B illustrates a neutron source burst time cycle. The cycle includes one inelastic interaction and one capture interaction. The inelastic time cycle starts at t=0 and takes 40 microseconds while the capture time cycle starts at t=40 microseconds and ends at 90 microseconds. During the inelastic time cycle, a pulsed neutron source emits neutrons and during the capture time cycle the pulsed neutron source does not emit neutrons. Two popular spectral analysis methods in the pulsed neutron logging are spectral-ratio and full-spectrum fitting techniques. The application of the proposed method will be described for each technique.

Carbon and oxygen are of particular interest in oil well logging. Carbon and oxygen ('C/O') logging is a widely applied type of pulsed neutron logging for oil and water saturation in the formation. In the C/O mode, relative amounts of carbon & oxygen in the formation are identified to generate a C/O ratio. As is apparent, the C/O ratio would be higher in hydrocarbon bearing formations than in water bearing formations, holding other factors (e.g., porosity, lithology, etc) the same. C/O logging uses scintillation detectors to identify the gamma rays from carbon and oxygen, which are produced from a neutron inelastic scattering interaction. In practice, the most important gamma rays emitted from these elements may be at 4.44 MeV for carbon and 6.13 MeV for oxygen. The following table shows the typical inelastic gamma rays and the energy windows used for carbon and oxygen:

TABLE 1

| Nucleus | Energy (MeV) | Window (MeV) |
|---------|--------------|--------------|
| Carbon  | 4.44         | 3.21-4.75    |
| Oxygen  | 6.13, 7.1    | 4.79-7.05    |

The ratio of the gamma-ray counts in the carbon window to those in the oxygen window (C/O ratio) is proportional to the ratio of the number of carbon nuclei to the number of oxygen nuclei in the medium surrounding the tool, which, with proper interpretation, can be used to estimate the formation oil saturation and determine the amount of residual oil.

Carbon/oxygen measurements suffer from a relatively low signal-to-noise ratio due to several factors. For example, the relative change of the carbon/oxygen ratio from a water-saturated to an oil-saturated formation is generally less than 20%, which is comparatively difficult to identify; total inelastic counts are usually much less than the capture counts and therefore results as a small fraction of the total counts, causing difficulty in obtaining sufficient inelastic counts on the detector; borehole sigma (capture cross section) usually is much larger than the formation sigma; the detector sizes directly impact the statistical precision of the C/O measurement, especially in through-tubing carbon/oxygen instruments.

Figure 4:
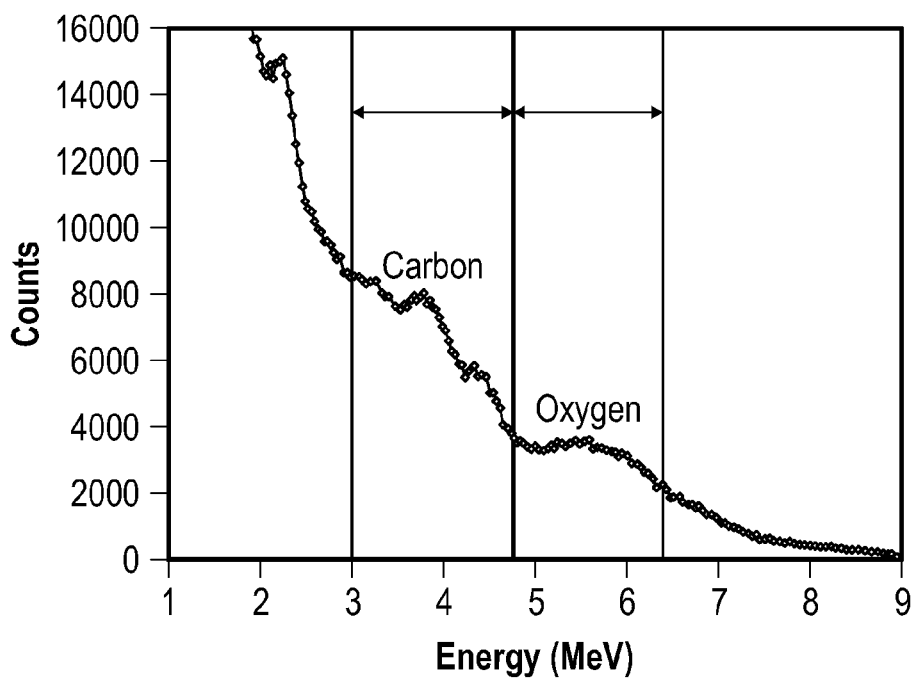
FIG. 4 shows an example C/O spectrum in accordance with embodiments of the present disclosure.

Given the above factors, the efficiency of the traditional C/O tools has been significantly held back due the difficulty in distinguishing carbon and oxygen peaks from the rest of the spectrum. The low counts require slow logging speed (e.g., 2 ft/min) and multiple passes (e.g., 3-5) and therefore significantly increase the Non-Productive Time ('NPT'). An example of C/O spectrum is shown in FIG. 4.

The pulse detection and classification system proposed in this method could be applied to enhance the performance of C/O logging. Spectrum A which has the high confidence level can help to eliminate pulse associated with environment noise. With higher confidence level, accurate count ratio between Carbon and Oxygen could be obtained which is used to predict the fluid saturation in the formation. However, it has the lowest sampling ratio and may not meet the requirements in count rates.

Since the accuracy of statistical counts in carbon and oxygen spectrum windows is the key for this particular application, we can further categorize the pulses in risk Categories 2 and 3. These pulses has a bottom boundary value which is the lowest possible energy level calculated due to the pulse pile-up. So the true pulse energy level is between the bottom boundary value and the detected pulse level. If this energy range falls into the carbon spectrum window or the oxygen spectrum window, then this pulse will be categorized into either carbon counts or oxygen counts without uncertainty. By using this proposed categorization system, higher statistical counts can be obtained with the statistical uncertainty eliminated. It can also reduce the number of logging passes required to one single pass and thus minimize the NPT.

Figure 5:
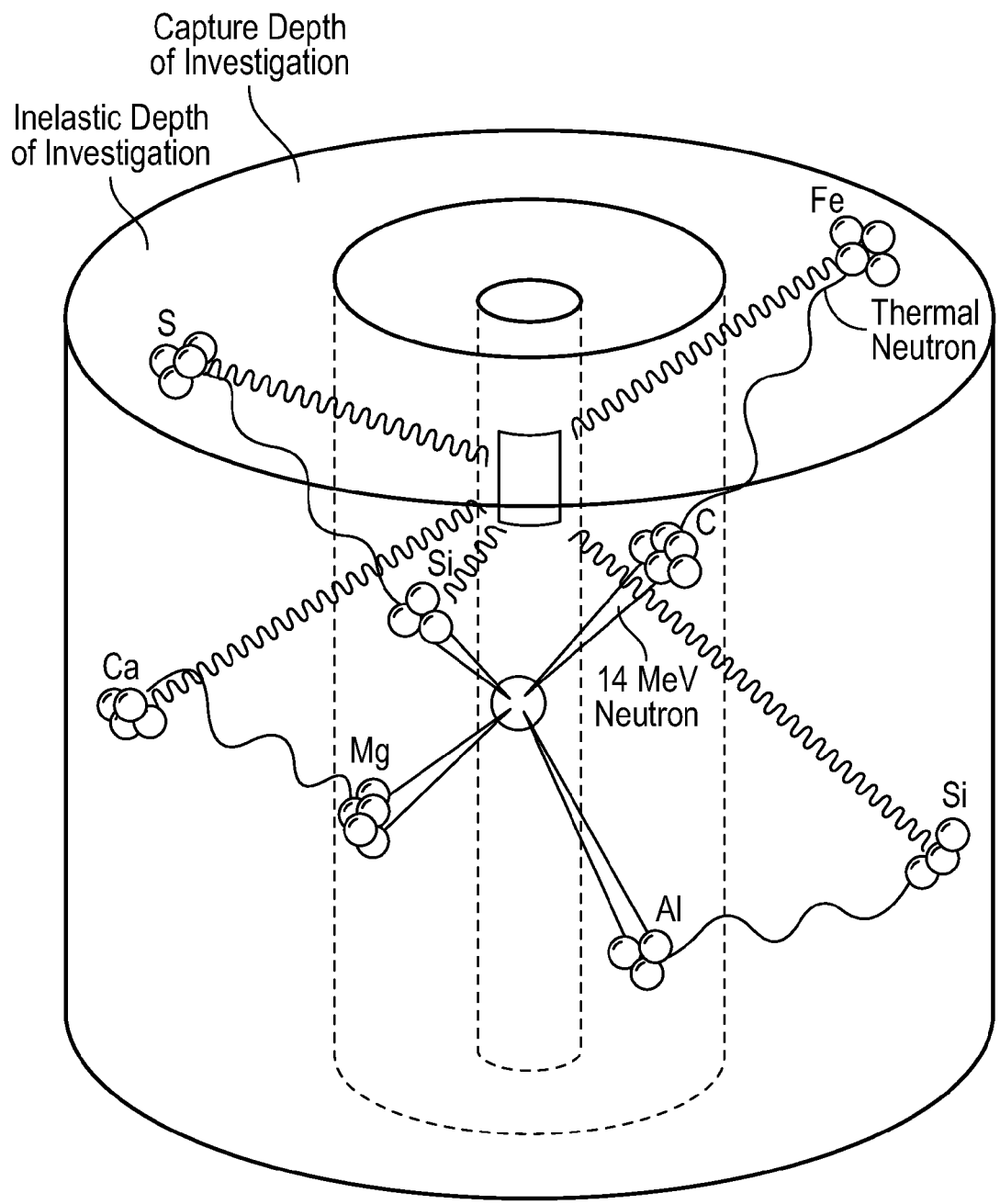
FIG. 5 shows an example neutron interaction associated with embodiments of the present disclosure.
Figure 6:
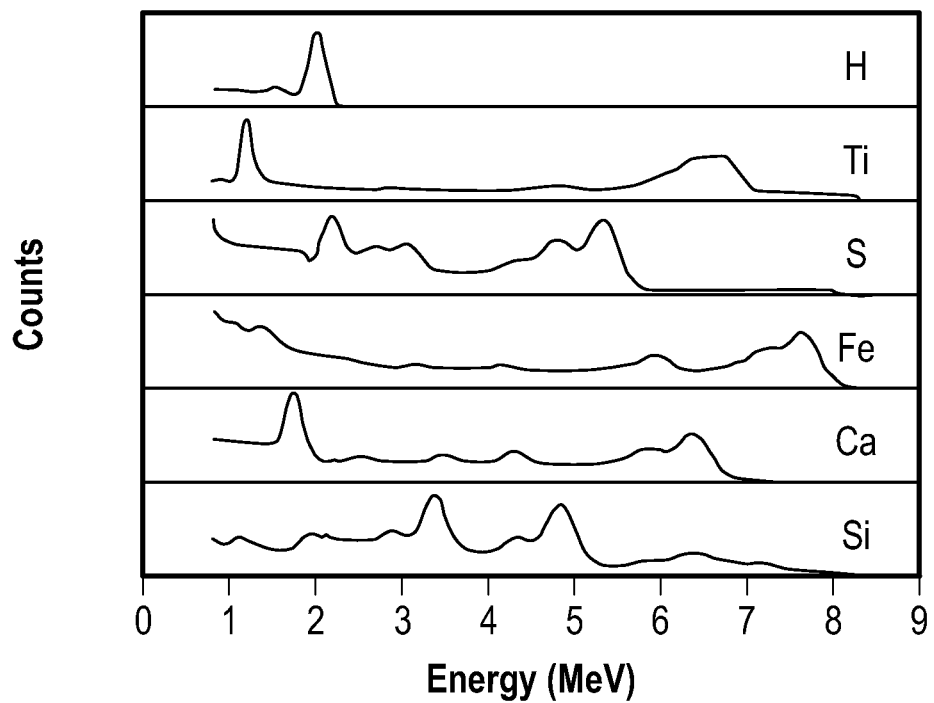
FIGS. 6 & 7 show example capture and inelastic elemental standards in accordance with embodiments of the present disclosure.
Figure 7:
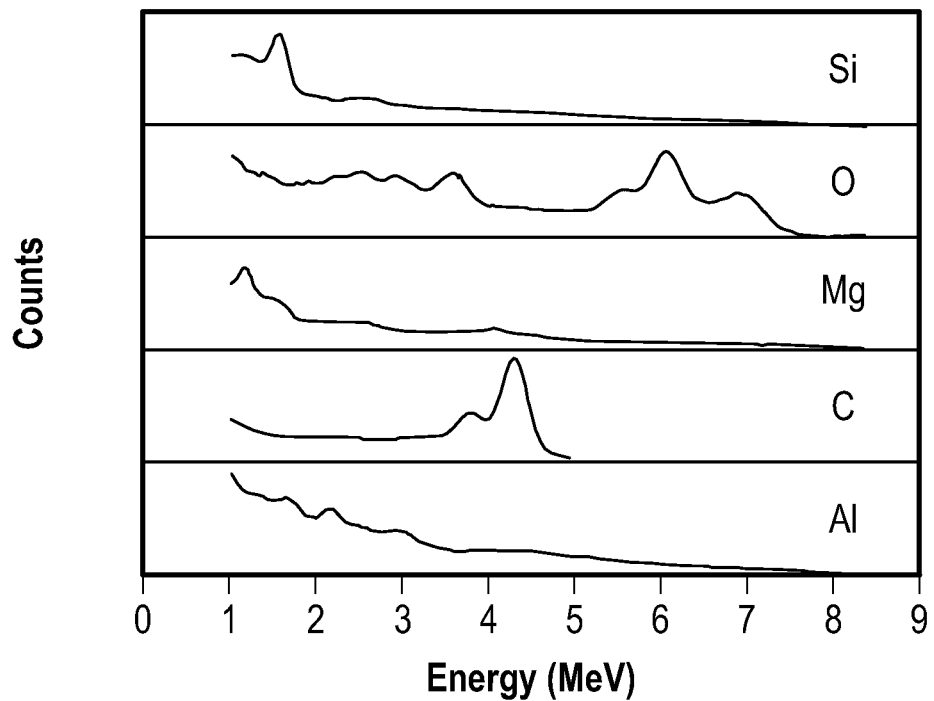

Full-spectrum fitting in pulsed neutron logging can provide lithological and quantitative mineralogical information for accurate formation evaluation. The logging system utilizes an electronic pulses source to send high energy neutrons into the surrounding formation. These neutrons quickly lose energy as a result of scattering, after which they are absorbed by the various atoms within the ambient environment. The scattered as well as the absorbed neutrons cause the atoms of the various elements to emit gamma rays with characteristic energies, resulting in both inelastic and capture gamma ray energy spectra. The associated neutron interaction is shown in FIG. 5. The capture and inelastic elemental standards are shown in FIG. 6 and FIG. 7.

Elemental standards-based spectral decomposition may use a combination of reference spectra, with each reference spectrum multiplied by a respective weighting coefficient. Typically a reference spectrum is included for each element of interest (e.g., an element the concentration of which is desired to be known), or for each element producing significant radiation. Each reference spectrum represents a response curve corresponding to radiation attributable to a particular sample element (e.g., uranium). Deconvolution may be linear or non-linear, and may be carried out on the response spectrum holistically without energy windows (i.e., "windowlessly"). These coefficients may be used to determine the portion of the matter of the volume constituted by the sample element. The response spectrum may be measured over a wide range of energies, resulting in improved estimation of the parameter of interest. For example, the response spectrum may span a continuous energy range including gamma ray photo peaks at characteristic energies associated with respective elements for all of the sample elements.

The standard spectra may be derived from analysis of the samples in a laboratory or on-site, or may be modeled standards—that is, standards derived using a variety of numerical, simulated, statistical, or other software-based techniques (e.g., Monte Carlo techniques), which may be obtained using a variety of methods. In one example, gamma ray measurement of a sample may provide a response spectrum to be used as the reference spectrum ('standard') for that element. Variations in patterns may be used for analysis of "shapes" and "peaks" to attribute gamma ray counts to a specific radiation responsive component (e.g., the first radiation responsive component, the second radiation responsive component, etc.).

In order to collect enough counts to meet statistical requirements, the current system has to yield low logging speed. Aspects of the present disclosure enable tailoring of the spectrum for either higher confidence level or higher logging speed by the selection of the corresponding subset spectra. If the highest confidence is the utmost priority, Spectrum 1 may be selected for post processing; if the highest logging speed is the utmost priority, Spectra 1-4 may be selected for post processing. Other spectra provide a balance between accuracy and logging speed.

Figure 8:
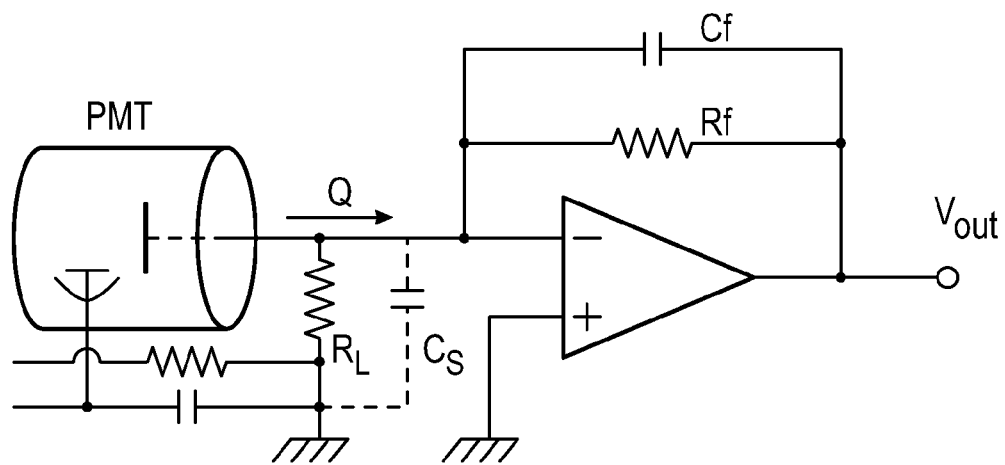
FIG. 8 shows a charge-sensitive preamplifier in accordance with the present disclosure.

FIG. 8 shows a charge-sensitive preamplifier in accordance with the present disclosure. The preamplifier may be an analog circuit operatively coupled to the detector providing an interface between the detector and the ADC. The main function of the preamplifier is to integrate the burst charge Q outputted by the detector into a voltage signal. The pulse current from crystals can be approximated by an exponential function with a delay time constant $$\tau_s \text{ as } i(t) = \frac{Q}{\tau_s}\exp\left(-\frac{t}{\tau_s}\right),$$

where the total charges $$Q = \int_0^\infty i(t)\,dt.$$

The capacitor $C_f$ is charged by i(t) and is also discharged by resistor $R_f$. The output voltage $V_{out}$ can be expressed as $$V_{out}(t) = \frac{QR_f}{\tau_f - \tau_s}\left(\exp\left(-\frac{t}{\tau_f}\right) - \exp\left(-\frac{t}{\tau_s}\right)\right), \quad (\text{Eqn. 1})$$

where $\tau_f = R_f C_f$ is the time constant of the discharging.

The amplitude of $V_{out}$ occurs at $$t_{peak} = \frac{\tau_f \tau_s}{\tau_f - \tau_s}\ln\frac{\tau_f}{\tau_s}. \quad (\text{Eqn. 2})$$

Eqn. 2 shows that the peak time $t_{peak}$ is independent of the charge Q. Putting $t=t_{peak}$ into Eqn. 1, the amplitude of $V_{out}$ can be written as $$V_{max} = \frac{Q}{(1-a)C_f}\left(\exp\frac{a\ln(a)}{a-1} - \exp\frac{\ln(a)}{a-1}\right), \quad (\text{Eqn. 3})$$

where $$a = \frac{\tau_s}{\tau_f}$$

is a ratio of time constants.

The digital filters in pulse shaping can be implemented either as an FIR (finite impulse response) filter structure, or an IIR (infinite impulse response) filter structure, or a mixed format. Filters may be implemented in an FPGA or an ASIC device. The digitalized pulse signal can go through several filters in parallel.

Figure 9:
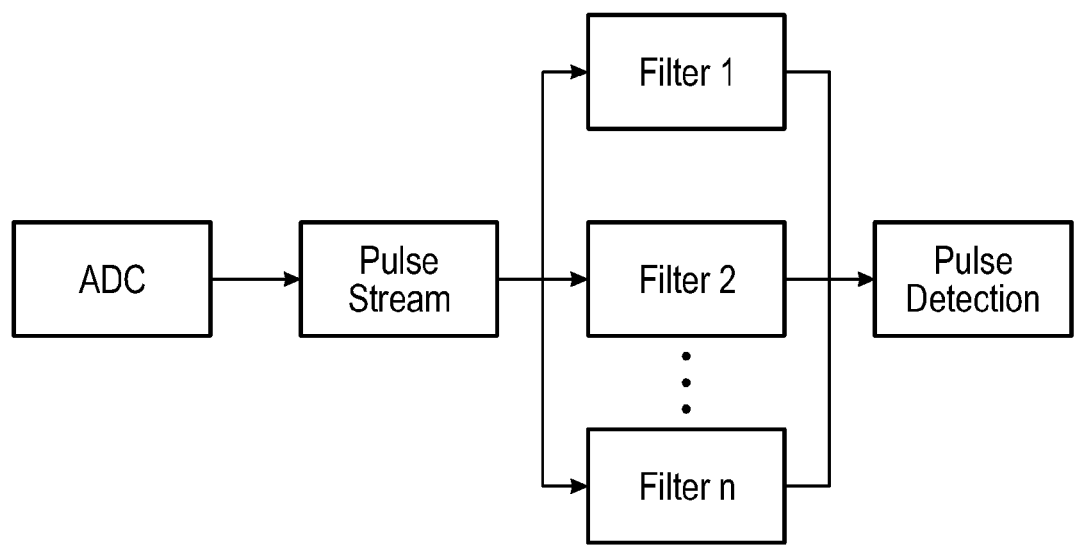
FIG. 9 illustrates a parallel filter system in accordance with embodiments of the present disclosure.

FIG. 9 illustrates a parallel filter system in accordance with embodiments of the present disclosure. The filters have different coefficients and response characterizations. For example, Filter 1 may apply an edge detection to detect the pulse event. Filter 2 may have a shifted delay to Filter 1 to detect the pulse duration. Filter 3 may use a fat top in the response to detect the amplitude. Outputs of the filters proceed to the pulse detection system.

Figure 10:
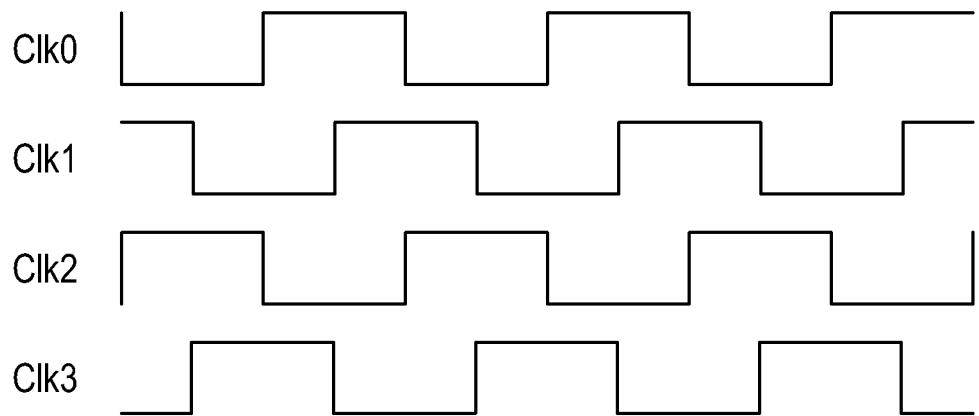
FIG. 10 shows the time domain under a 4-channel ADC system in accordance with embodiments of the present disclosure.

FIG. 10 shows the time domain under a 4-channel ADC system in accordance with embodiments of the present disclosure. The high speed pulse acquisition system can utilize a time-interleaved ADC sampling and processing architecture. The high counting system is achieved by utilizing multiple ADCs clocked at the same speed but with evenly staggered clock phases. The effective sampling rate is the number of ADCs multiplied by the sample clock.

Figure 11:
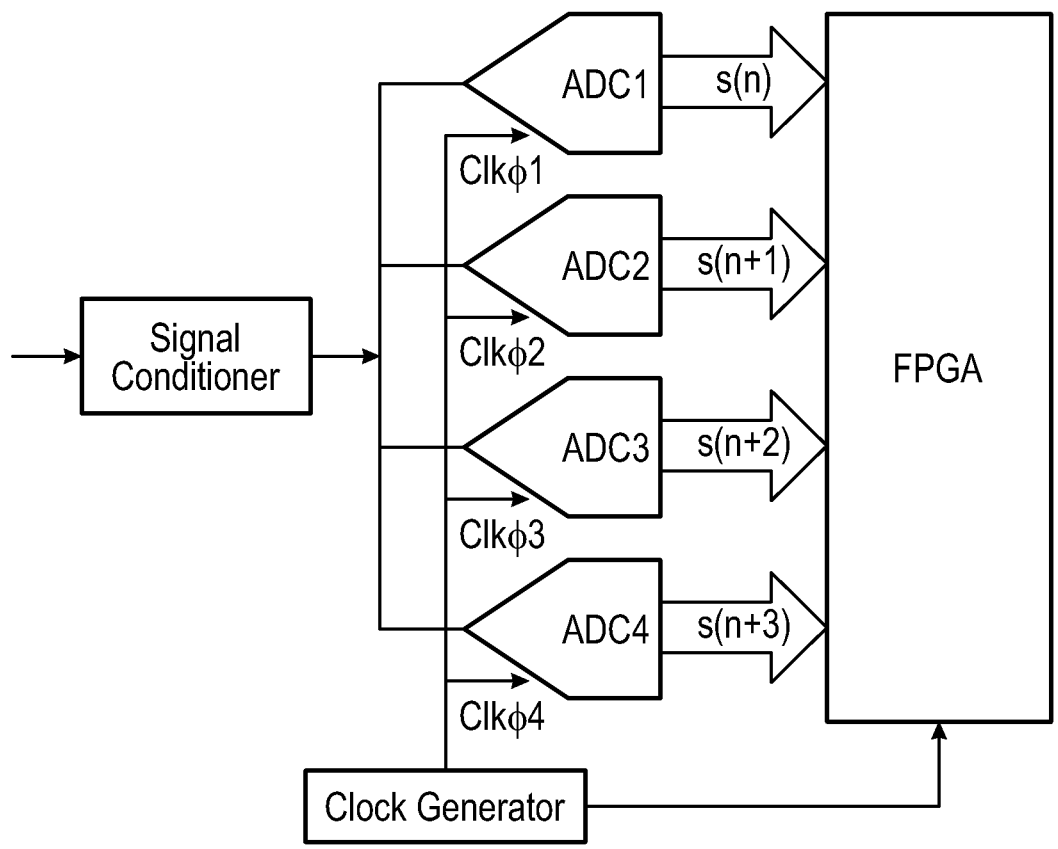
FIG. 11 shows a time-interleaved ADC system in accordance with embodiments of the present disclosure.

FIG. 11 shows a time-interleaved ADC system in accordance with embodiments of the present disclosure. In FIG. 11, the input to each ADC channel is sampled at the rate of Fs (=1/Ts) samples per second. Each ADC sample clock is offset relative to the other sample clocks by a fraction of the clock period Ts. If M is the total number of ADCs, then the fractional phase offset is φm=m*Ts/M, m=0, 1, . . . , M−1. The effective sample rate is 4*Fs.

Figure 12:
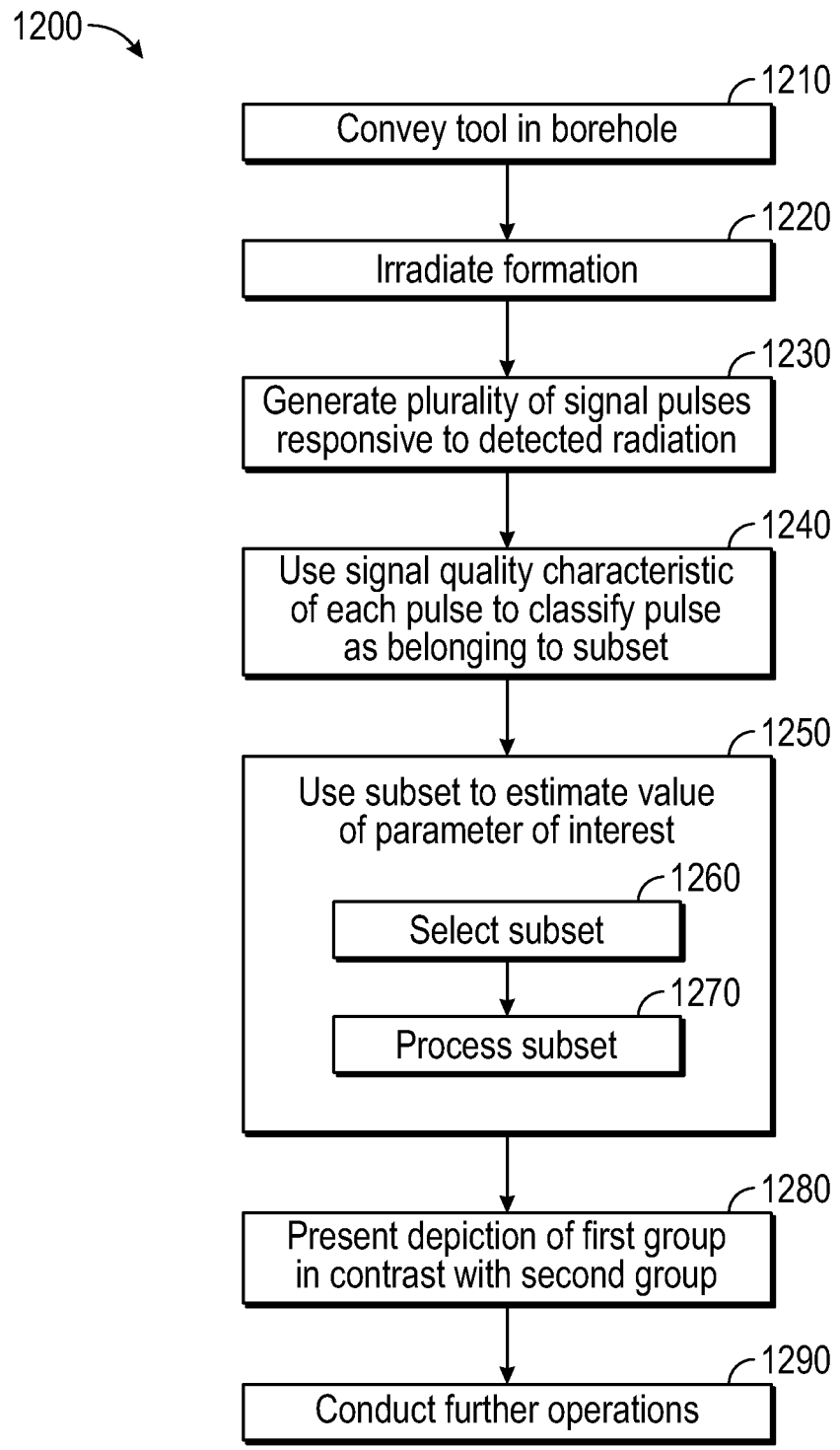
FIG. 12 shows, in flow chart form, methods for evaluating an earth formation in accordance with the present disclosure.

FIG. 12 shows, in flow chart form, one method 1200 in accordance with the present disclosure for evaluating an earth formation 80 (FIG. 1). Optional step 1210 may include conveying a logging tool in a borehole intersecting the formation 80. Optional step 1220 may include irradiating the formation to generate radiation indicative of formation properties. Step 1230 may include using a downhole tool in a borehole intersecting the formation to generate a plurality of signal pulses responsive to detected radiation. This may be carried out by using the scintillation detector to generate electrical events responsive to scintillation events, wherein the scintillation events are indicative of radiation from the formation incident on the scintillation detector, and converting the electrical events to the signal pulses.

The detected radiation may be indicative of a parameter of interest of the formation or the borehole. Step 1240 may include using at least one signal quality characteristic of each pulse of the plurality of pulses to classify each pulse as belonging to at least one subset of a plurality of pulse subsets. Step 1250 may include using one of more of the plurality of pulse subsets to estimate a value of a parameter of interest. The signal quality characteristic is indicative of a pulse pile-up condition being associated with the respective pulse. The signal quality characteristic may include at least one of: i) rising time (slope) of the respective pulse; ii) time between a peak of the respective pulse and a peak of a closest following pulse; iii) pulse width; and iv) skewness of the pulse (the third moment of the standard score of the pulse).

Step 1260 may include selecting a subset of pulses for use in further processing to estimate a parameter of interest. This may be carried out by selecting the one or more pulse subsets for use in of the plurality of subsets for estimating the property in dependence upon a selected parameter of interest, selecting the one or more pulse subsets for use in of the plurality of subsets for estimating the property in dependence upon a selection of relative importance of accuracy with respect to count rate, and so on. Step 1270 may include processing the selected subset to estimate a parameter of interest. The detected radiation may include gamma rays and the subset of pulses represents a gamma ray spectrum. Further processing may include processing a gamma ray spectrum using at least one of: i) a windowing method; and ii) a full-spectrum deconvolution method. The gamma ray spectrum comprises at least one of: i) an inelastic gamma ray spectrum, and ii) a capture gamma ray spectrum.

Step 1280 may include presenting a depiction of a first group of pulses comprising a first subset of the plurality of pulse subsets in contrast with a depiction of a second group of pulses comprising a second subset of the plurality of pulse subsets. Step 1290 may include conducting further operations in the formation in dependence upon the results of further processing.

The confidence level of the pulses may be further adjusted based on various parameters, e.g. Logging speed, count rate, etc. Taking pulses with low confidence into the spectra can increase the count rate, which in turn reduces the logging time. Only taking pulse with the highest confidence to build spectra can reduce the noise level but resulting in a low count rate. The best confidence level used to merge the spectra can be justified by off-line experiences and simulation.

In some embodiments, full-spectrum deconvolution results may be further processed. Spectrum calibration and alignment may be the very first step for pulsed neutron full-spectrum fitting. Incorrect peak locations due to low count rates or bad pulse identification may result in wrong gain adjustment and distorted spectra. Eventually it will affect the final element outputs. By using the high confidence spectrum (Spectrum 1), accurate peak locations can be obtained for better gain adjustment and calibration.

Once the best peak locations are determined based on high confidence spectrum, the pulses with lower confidences (Categories 2-4) near the peak locations with a predefined bottom boundary value (e.g., the lowest possible energy level calculated due to the pulse pile-up) may be added into the high confidence spectrum using statistical algorithms such as Gaussian distribution or gamma functions, to increase the count rates of the spectra. Various spectra with different confidence levels can also be used for quality control (QC) purposes by comparing the shape of the derived spectra.

Herein, the term "information" may include, but is not limited to, one or more of: (i) raw data, (ii) processed data, and (iii) signals. The term "conveyance device" as used above means any device, device component, combination of devices, media and/or member that may be used to convey, house, support or otherwise facilitate the use of another device, device component, combination of devices, media and/or member. Exemplary non-limiting conveyance devices include drill strings of the coiled tube type, of the jointed pipe type and any combination or portion thereof. Other conveyance device examples include casing pipes, wirelines, wire line sondes, slickline sondes, drop shots, downhole subs, BHA's, drill string inserts, modules, internal housings and substrate portions thereof, self-propelled tractors. As used above, the term "sub" refers to any structure that is configured to partially enclose, completely enclose, house, or support a device. Parameter of interest means property of a formation or a borehole. The term "information" as used above includes any form of information (Analog, digital, EM, printed, etc.). The term "information processing device" herein includes, but is not limited to, any device that transmits, receives, manipulates, converts, calculates, modulates, transposes, carries, stores or otherwise utilizes information. An information processing device may include a microprocessor, resident memory, and peripherals for executing programmed instructions. A pulse may be defined as a rapid change in some characteristic of a signal, (e.g., amplitude, phase, or frequency) from a baseline value to a higher or lower value, followed by a rapid return to the baseline value. The term subset is meant here to mean a proper (strict) subset. That is, a subset of pulses as defined herein is not identical to the plurality of pulses.

As used above, the term "detect" refers to interaction in the sense of converting ionizing radiation to other detectable indicia, such as, for example, photons. As used above, the term "incident" or "incident on" refers to impinging on the physical space of or penetrating the defining boundaries of As used above, the term "traverse" means to pass through.

The present disclosure is susceptible to embodiments of different forms. While the present disclosure is discussed in the context of a hydrocarbon producing well, it should be understood that the present disclosure may be used in any borehole environment (e.g., a geothermal well). There are shown in the drawings, and herein are described in detail, specific embodiments of the present disclosure with the understanding that the present disclosure is to be considered an exemplification of the principles of the disclosure and is not intended to limit the disclosure to that illustrated and described herein. While the foregoing disclosure is directed to the one mode embodiments of the disclosure, various modifications will be apparent to those skilled in the art. It is intended that all variations be embraced by the foregoing disclosure.

We claim:

1. A method of evaluating an earth formation, comprising:
   using a downhole tool in a borehole intersecting the formation to generate a plurality of signal pulses responsive to detected radiation;
   using at least one signal quality characteristic of each pulse of the plurality of pulses to classify each pulse as belonging to at least one subset of a plurality of pulse subsets, wherein the signal quality characteristic is indicative of a pulse pile-up condition being associated with the respective pulse; and
   using one of more of the plurality of pulse subsets to estimate a value of a parameter of interest.

2. The method of claim 1, wherein the signal quality characteristic comprises at least one of: i) rising time (slope) of the respective pulse; ii) time between a peak of the respective pulse and a peak of a closest following pulse; iii) pulse width; and iv) skewness of the pulse.

3. The method of claim 1, wherein the detected radiation comprises gamma rays and the subset of pulses represents a gamma ray spectrum.

4. The method of claim 3 comprising processing the gamma ray spectrum using at least one of: i) a windowing method; and ii) a full-spectrum deconvolution method.

5. The method of claim 3, wherein the gamma ray spectrum comprises at least one of: i) an inelastic gamma ray spectrum, and ii) a capture gamma ray spectrum.

6. The method of claim 1, comprising presenting a depiction of a first group of pulses comprising a first subset of the plurality of pulse subsets in contrast with a depiction of a second group of pulses comprising a second subset of the plurality of pulse subsets.

7. The method of claim 1, comprising selecting the one or more pulse subsets for use in of the plurality of subsets for estimating the property in dependence upon a selected parameter of interest.

8. The method of claim 1, wherein the pulses are digital pulses resulting from continuous analog-to-digital conversion.

9. The method of claim 1, comprising selecting the one or more pulse subsets for use in of the plurality of subsets for estimating the property in dependence upon a selection of relative importance of accuracy with respect to count rate.

10. The method of claim 1, wherein the downhole tool comprises a scintillation detector on a conveyance device and using the downhole tool to generate the plurality of signal pulses comprises:
    using the scintillation detector to generate electrical events responsive to scintillation events, wherein the scintillation events are indicative of radiation from the formation incident on the scintillation detector, and
    converting the electrical events to the signal pulses.

11. An apparatus for evaluating an earth formation intersected by a borehole, the apparatus comprising:
    at least one detector configured to generate a plurality of signal pulses responsive to detected radiation; and
    at least one processor configured to:

use the at least one detector to generate a plurality of signal pulses responsive to radiation detected while the detector is in the borehole;

use at least one signal quality characteristic of each pulse of the plurality of pulses to classify each pulse as belonging to at least one subset of a plurality of pulse subsets wherein the signal quality characteristic is indicative of a pulse pile-up condition being associated with the respective pulse; and use one of more of the plurality of pulse subsets to estimate a value of a parameter of interest.

12. The apparatus of claim 11, wherein the signal quality characteristic comprises at least one of: i) rising time of the respective pulse; ii) time between a peak of the respective pulse and a peak of a closest following pulse; iii) pulse width; and iv) skewness of the pulse.

13. The apparatus of claim 11, wherein the detected radiation comprises gamma rays and the subset of pulses represents a gamma ray spectrum.

14. The apparatus of claim 11 wherein the at least one processor is configured to perform at least one of: i) a windowing method; and ii) a full-spectrum deconvolution method.

15. The apparatus of claim 11 wherein the at least one processor is configured to present a depiction of a first group of pulses comprising a first subset of the plurality of pulse subsets in contrast with a depiction of a second group of pulses comprising a second subset of the plurality of pulse subsets.

16. The apparatus of claim 11 wherein the at least one processor is configured to select the one or more pulse subsets for use in of the plurality of subsets for estimating the property in dependence upon a selection of relative importance of accuracy with respect to count rate.

17. A non-transitory computer-readable medium product for evaluating an earth formation comprising machine-readable instructions disposed on the medium that, when executed by a processor, cause the at least one processor to carry out a method, the method comprising:

using a downhole tool in a borehole intersecting the formation to generate a plurality of signal pulses responsive to detected radiation;

using at least one signal quality characteristic of each pulse of the plurality of pulses to classify each pulse as belonging to at least one subset of a plurality of pulse subsets, wherein the signal quality characteristic is indicative of a pulse pile-up condition being associated with the respective pulse; and using one of more of the plurality of pulse subsets to estimate a value of a parameter of interest.

* * * * *